US011167387B2

(12) United States Patent
Epperlein et al.

(10) Patent No.: US 11,167,387 B2
(45) Date of Patent: Nov. 9, 2021

(54) DISCHARGING PLATE-SHAPED WORKPIECE PARTS THAT HAVE BEEN CUT FREE

(71) Applicant: TRUMPF Werkzeugmaschinen GmbH + Co. KG, Ditzingen (DE)

(72) Inventors: Peter Epperlein, Leonberg (DE); Marc Klinkhammer, Ditzingen (DE); Johannes Krampfert, Ditzingen (DE); Oskar Nahoczky, Stuttgart (DE); Frank Schmauder, Metzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 103 days.

(21) Appl. No.: 16/204,302

(22) Filed: Nov. 29, 2018

(65) Prior Publication Data

US 2019/0091817 A1 Mar. 28, 2019

Related U.S. Application Data

(63) Continuation of application No. PCT/EP2017/062544, filed on May 24, 2017.

(30) Foreign Application Priority Data

Jun. 1, 2016 (DE) ...................... 10 2016 209 550.1

(51) Int. Cl.
*B23Q 7/08* (2006.01)
*B23K 26/38* (2014.01)
(Continued)

(52) U.S. Cl.
CPC .............. *B23Q 7/008* (2013.01); *B23K 10/00* (2013.01); *B23K 26/38* (2013.01);
(Continued)

(58) Field of Classification Search
CPC .... B23Q 11/0046; B23Q 7/006; B23Q 7/008; B23Q 7/12; H05H 1/34; B23K 37/0235; B23K 26/38
(Continued)

(56) References Cited

U.S. PATENT DOCUMENTS

| 4,993,296 A | 2/1991 | Nasu |
|---|---|---|
| 5,763,852 A | 6/1998 | Brolund et al. |

(Continued)

FOREIGN PATENT DOCUMENTS

| CN | 101305644 | 11/2008 |
|---|---|---|
| CN | 101715379 | 5/2010 |

(Continued)

OTHER PUBLICATIONS

International Search Report and Written Opinion in International Application No. PCT/EP2017/062544, dated Sep. 7, 2017, 21 pages (with English translation).

(Continued)

*Primary Examiner* — Sara Addisu
(74) *Attorney, Agent, or Firm* — Fish & Richardson P.C.

(57) ABSTRACT

A machine for separative machining of a plate-shaped workpiece by a processing beam. The machine has a first movement unit for moving the workpiece in a first direction, a second movement unit for moving a processing head in a second direction, two workpiece bearing supports for bearing the workpiece, and a parts chute. The two workpiece bearing supports are separated from each other by a gap that extends along the second direction. The parts chute is movable between a first chute position and a second chute position so as to move a cut-free workpiece part that has dropped into the gap, laterally away from the gap. The machine includes a receiving unit movable in the second direction, to receive the cut-free workpiece part at a transfer (Continued)

position and transport the workpiece part to one or more discharging positions of the machine along the second direction.

19 Claims, 4 Drawing Sheets

(51) Int. Cl.

| | | |
|---|---|---|
| *B23Q 7/00* | (2006.01) | |
| *B26D 7/20* | (2006.01) | |
| *B26F 3/00* | (2006.01) | |
| *B23K 37/02* | (2006.01) | |
| *B23K 37/04* | (2006.01) | |
| *B23K 10/00* | (2006.01) | |
| *B24C 1/04* | (2006.01) | |
| *B26F 1/38* | (2006.01) | |
| *B23Q 7/12* | (2006.01) | |
| *B23Q 11/00* | (2006.01) | |

(52) U.S. Cl.
CPC ...... *B23K 37/0235* (2013.01); *B23K 37/0288* (2013.01); *B23K 37/0408* (2013.01); *B23Q 7/006* (2013.01); *B23Q 7/12* (2013.01); *B23Q 11/0046* (2013.01); *B24C 1/045* (2013.01); *B26D 7/20* (2013.01); *B26F 1/3813* (2013.01); *B26F 3/004* (2013.01)

(58) Field of Classification Search
USPC .............. 29/121.39, 121.56, 121.58, 121.72, 29/121.67
See application file for complete search history.

(56) References Cited

U.S. PATENT DOCUMENTS

| | | | | |
|---|---|---|---|---|
| 6,229,112 B1* | 5/2001 | Scott | ................. | B23K 26/10 |
| | | | | 219/121.67 |
| 7,084,368 B2* | 8/2006 | Yamaguchi | .............. | B23K 5/22 |
| | | | | 219/121.36 |
| 8,288,677 B2 | 10/2012 | Aunitzky et al. | | |
| 8,466,388 B2* | 6/2013 | Zeygerman | ............. | B08B 15/04 |
| | | | | 219/121.83 |
| 9,000,321 B2* | 4/2015 | Yamaguchi | .............. | B23K 7/10 |
| | | | | 219/68 |
| 10,220,475 B2* | 3/2019 | Schmauder | ........ | B23K 37/0288 |
| 2009/0114069 A1 | 5/2009 | Aunitzky et al. | | |
| 2010/0132526 A1 | 6/2010 | Wahl et al. | | |
| 2016/0297036 A1 | 10/2016 | Schmauder et al. | | |
| 2016/0311069 A1* | 10/2016 | Deiss | ................. | B23K 26/0876 |

FOREIGN PATENT DOCUMENTS

| | | |
|---|---|---|
| CN | 203418239 | 2/2014 |
| DE | 10 2011 051 170 | 12/2012 |
| DE | 10 2013 226 818 | 7/2015 |
| JP | H02-274494 A | 11/1990 |
| JP | H06170469 | 6/1994 |
| JP | H08-066789 | 3/1996 |
| JP | H11147192 | 6/1999 |
| JP | 2000-233293 | 8/2000 |
| JP | 2001-191233 | 7/2001 |
| JP | 2002 187042 | 7/2002 |
| WO | WO 90/00952 | 2/1990 |
| WO | WO 2015/091252 | 6/2015 |
| WO | WO 2015/091347 | 6/2017 |

OTHER PUBLICATIONS

KR Notice of Allowance in Korean Appln. No. 10-2018-7036097, dated Nov. 20, 2020, 7 pages (with English translation).
CN Office Action in Chinese Appln. No. 201780047814.2, dated Sep. 1, 2020, 10 pages (with English translation).

* cited by examiner

DISCHARGING PLATE-SHAPED WORKPIECE PARTS THAT HAVE BEEN CUT FREE

CROSS REFERENCE TO RELATED APPLICATIONS

This application is a continuation of and claims priority under 35 U.S.C. § 120 from PCT Application No. PCT/EP2017/062544 filed on May 24, 2017, which claims priority from German Application No. DE 10 2016 209 550.1, filed on Jun. 1, 2016. The entire contents of each of these priority applications are incorporated herein by reference.

TECHNICAL FIELD

The present invention relates to a machine for separative machining of a plate-shaped workpiece and discharging a workpiece part from the machine.

BACKGROUND

A machine for separative machining of a plate-shaped workpiece as described above has been disclosed in DE 10 2013 226 818 B4. On a machine of this type having a hybrid motion control in which the workpiece is moved in a first direction (X-direction) and the processing head is moved in a second direction (Y-direction), the workpiece bearing in the movement range of the processing head is interrupted in order to avoid damage by the processing beam. A gap in the Y-direction thus extends in the workpiece bearing between two workpiece bearing faces. The processing beam that has penetrated the workpiece and any slag and cutting waste that arises are expelled through said gap. The processing beam can be a laser beam, but the use of any other type of high-energy beam, for example in the form of a plasma arc or of a water jet, is also possible. In such a machine, workpiece parts that have been cut free from a residual workpiece (sheet skeleton) and that are sufficiently small can be discharged downward through the gap.

It is proposed in DE 10 2013 226 818 B4 that at least two support slides that are displaceable in a mutually independent manner in the second direction are disposed within the gap, said support slides having in each case one bearing face for supporting workpiece parts that are cut during separative machining. In order for the cut-free workpiece part to be discharged, the bearing faces of the support slides, or the support slides per se, can be lowered below a workpiece bearing plane.

As an alternative possibility for separating good parts from scrap parts that drop freely through the gap it is proposed in DE 10 2013 226 818 B4 to use a small-parts chute that is attached adjacent to a bearing face on one of the support slides.

A machine for removing a product for a laser processing machine is described in WO 90/00952. A gap that runs perpendicularly to a longitudinal direction of a table for bearing a workpiece is formed in the machine. The gap also runs along a direction of movement of a processing head which is attached to a lower side of the frame of the laser processing machine. A dust collection chamber that is connected to a blower and has a sealed structure is disposed below the gap. A first and second pivotable parts chute are arranged spaced apart from one another on a side of the processing head that is downstream in relation to a transport direction of the product.

A parts chute which has a first chute and a second chute has become known from JP 2000 233 293 A, wherein the second chute is attached on a laser processing side of the first chute so as to be pivotable by way of a joint. The second chute can be pivoted from a horizontal position, while the first chute simultaneously remains in the horizontal position. In the pivoted position small workpiece parts can slide on the second chute in the direction toward a laser processing head so as to discharge said workpiece parts from the machine. A side wall of a duct that is formed below the laser processing head is conjointly pivoted in the pivoting movement of the second chute.

A shooter for separating or sorting inter-alia good parts and scrap, is described in JP 2002 187 042 A.

A processing machine in which a plurality of products can be stored in assorted manner in a plurality of storage compartments of a depository has become known from JP 2001-191233. The machine has a pivotable chute which in a first position is actuatable to an opening region of the table and which in a second pivoted position is adjacent to a product receiving component which receives a respective product.

SUMMARY

One object of the present disclosure is to provide a machine for separative machining of plate-shaped workpieces, in particular a laser processing machine, and a method which enable a simplified discharging of cut-free workpiece parts.

One aspect of the invention features a parts chute that is movable between a first position (first chute position) and a second position (second chute position), wherein in the second position a chute face of the parts chute is arranged in the gap, so as to move a workpiece part that is cut free from the workpiece and drops into the gap laterally away from the gap; and a receiving unit, e.g. a collection carriage, movable in the second direction, for receiving the cut-free workpiece parts at one or more transfer positions in the second direction as well as for transporting the workpiece parts received at the transfer positions to different discharging positions of the machine in the second direction. In the first chute position, the parts chute does not protrude into the gap or protrudes only partially into the gap. In some embodiments, the parts chute in the first position typically protrudes only so far into the gap that at least a movement range of the processing beam in the gap that is defined by all potential positions of the processing beam in the first direction (also referred to as the "X-direction" herein) and the second direction (also referred to as the "Y-direction" herein) in the gap remains un-influenced. In other words, the parts chute in the first position does not protrude into the movement range of the processing beam, said movement range in the X-direction being potentially smaller than the width of the gap. A movement in the first direction or in the second direction is understood to be a movement both in the positive as well as in the negative first or second direction, respectively. The movement of the parts chute between the first position and the second position can be performed in a stepless manner between a plurality of intermediate positions.

As has been described above, workpiece parts that are sufficiently small, that is to say have dimensions in at least one direction smaller than the width of the gap, can be discharged from the machine downward through the gap. Workpiece parts which are sufficiently small so as to drop through the gap can have dimensions, for example, of at most 160 mm×160 mm, wherein these dimensions of course depend on the width of the gap.

The workpiece parts which drop into the gap can be good parts or scrap. A separation between good parts and scrap can be performed with the aid of the parts chute in that the parts chute remains in the first position when a workpiece part in the form of scrap drops into the gap, and is moved to the second position only when a good part is discharged laterally from the gap and is to be moved to a transfer position next to (or away from) the gap. The parts chute in this manner fulfils the function of a parts turnout for sorting or separating good parts and scrap.

The movement of the parts chute from the first position to the second position is typically performed only after the completion of cutting, for example after the processing beam, for example a laser beam, has been switched off. The movement of the parts chute from the first to the second position is typically performed only after the processing beam has been switched off in order for the contamination of the parts chute to be minimized, or in order to prevent the escape of cutting slag, gas, or dust from a suction box that is disposed in the gap below a workpiece bearing plane. In the movement of the parts chute to the second position the suction box is typically no longer sealed in relation to the environment. Depending on the size, the number, and the arrangement of the workpiece parts to be cut or cut free, the movement of the parts chute to the second position can however also commence prior to the processing beam being switched off, to reduce the time required for discharging the workpiece parts. For example, the parts chute can be moved to the second position already before individual or a plurality of workpiece parts that are connected to the residual workpiece (for example, connected by way of microwebs or microjoints) are severed in a final separation cut (for example, a common final cut).

The parts chute can be moved from the second position back to the first position as soon as the workpiece part has departed from the chute face or optionally at an earlier point of time. For example, when the movement of the parts chute from the second position to the first position has the effect of conveying the workpiece part (that bears on the chute face) away from the gap, for example when the chute face is aligned so as to be steeper (however not excessively steep) on account of the movement from the second to the first position, the parts chute can be moved from the second position back to the first position at an earlier time than when the workpiece part has departed from the chute face.

In order for a suitable point of time to be determined for the commencement of the movement from the second position to the first position, the machine can have a sensor unit. The sensor unit can be configured, for example, to detect the attainment of the transfer position or the departure of the workpiece part from the chute face. For this purpose, the sensor unit can for example have a light grid or the like, which detects the egress of the workpiece part from the suction region, or the lateral egress of the workpiece part from the gap when departing from the chute face. A control unit of the machine can trigger the movement of the parts chute from the second to the first position as soon as the departure from the chute face by the workpiece part, or the attainment of the transfer position is detected.

As an alternative to the detection of the point of time for the commencement of the movement of the parts chute from the second to the first position by means of a sensor unit (a sensor), the falling time of the workpiece part from the workpiece bearing plane until reaching the chute face of the parts chute that is located in the second position can be determined for this purpose. The time that is required for the workpiece part to slide along the chute face can optionally likewise be considered. An early movement of the parts chute from the second to the first position can be favorable since the cutting process can typically be continued only once the parts chute is at least approximately back in the first position, and the interruption of the cutting process due to the discharging of parts should ideally be short.

In order to minimize the interruption of the cutting process due to the discharging of parts and to enable sorting of parts, the machine has a receiving unit (or collection carriage) that is displaceable (at least) in the second direction. The receiving unit receives the workpiece part at the transfer position as well as transports the received workpiece parts to different discharging positions of the machine along the second direction. While it is proposed in the aforementioned DE 10 2013 226 818 B4 that, for transporting workpiece parts to different discharging positions along the gap, the two support slides having the cut-free workpiece part bearing on the bearing faces are displaced to a discharge position within the gap, in the machine according to the present disclosure invention the receiving unit is utilized for this purpose. For example, the receiving unit in the manner of a parts container (collection carriage or sorting carriage) is open towards the top or toward the parts chute to receive a cut-free workpiece part and discharges the part when the receiving unit is positioned at a discharge position. This enables sorting of the parts to be performed in parallel with the principal time of cutting workpieces and also at discharge positions that lie outside the movement range of the support slides, or outside the processing range of the machine.

The purpose of the receiving unit is to receive the workpiece part at the transfer position and to discharge said workpiece part from the machine at a desired discharge position along the gap, for example in that the workpiece part is deposited in a box positioned at the discharge position or is sorted into said box.

The transfer position typically approximately corresponds to the cutting-free position along the gap at which the workpiece part is separated from the residual workpiece. The receiving unit can be arranged at the transfer position during the separative machining of the workpiece, and receives the workpiece part at the transfer position as soon as said workpiece part departs from the chute face. The receiving unit typically has a sufficient extent in the second direction so as to be able to securely catch a workpiece part in the transfer position after said workpiece part has slid along the chute face of the parts chute. On the other hand, the extent is chosen so as to be small enough to avoid an excessive extent of the receiving unit (or of the catching carriage) that leads to a high weight and thus possibly to a limited sorting speed when moving the workpiece parts to different discharge positions by means of the receiving unit. In this way, the sorting of workpiece parts at different discharge positions, or into different collection containers, for example in the form of boxes, with the aid of the receiving unit can be performed in parallel with the main time used for cutting the workpiece.

The discharge positions are typically predefined positions in the second direction (Y-direction) along the gap. A collection container or the like can be arranged at a respective discharge position, for example, so as to catch workpiece parts that are discharged from the receiving unit. For example, the collection containers can be arranged in one row along the second direction, so as to be laterally next to the gap, in order for the workpiece parts to be caught or to be sorted into the collection containers. In some cases, the receiving unit, for example in the manner of a collection carriage, can be displaced only in one axial direction (Y-direction) laterally along the gap, in order for the workpiece parts to be deposited in the collection containers that are arranged in one row. However, it is also possible for the receiving unit to be movable not only in the second direction, that is to say parallel with the gap, but also in a further direction that is transverse to the gap (for example in the X-direction). In this case, two or more rows of collection containers can be provided that are arranged below a workpiece bearing face, so as to be laterally next to the gap. Different discharge positions can thus be provided in the machine not only in the second direction, but also in the further direction, so that a larger number of collection containers or boxes can be filled. In order for the collection containers to be retrieved from the machine and for said collection containers to be fed to the machine from outside the machine, a box carriage on which the collection containers are disposed can be used, for example.

The machine can have an additional motion unit for moving the processing head in the first direction (X-direction) within the gap, such as is described in DE 10 2013 226 818 B4 cited at the outset, for example. The range of movement of the processing head herein is typically limited to the gap, that is to say that the width of the gap is larger than or corresponds exactly to the movement range of the processing head in the X-direction.

In one embodiment, the receiving unit has at least one discharging unit (or discharging barrier) which is movable between a first position for supporting the workpiece part and a second position for discharging the workpiece part. The movement of the discharging unit, like the movement of the parts chute, can be controlled with the aid of a control unit (e.g. a controller) of the machine. The receiving unit is typically initially displaced to the desired discharging position before the discharging unit is moved from the first to the second position in order for the workpiece part at the discharging position to be deposited in a collection container arranged there, for example, or in order for the workpiece part to be allowed to drop into a collection container arranged there.

In one refinement the discharging unit in the first position forms at least a subarea of a bottom side of the receiving unit, and in the second position uncovers an opening at least in the subarea of the base region. The receiving unit can be configured, for example, in the manner of a collection carriage in the form of a parts container that has a bottom side that is at least in part formed by the discharging unit (in the first position). The parts container can have side walls having an inclination in order for the workpiece parts to be channeled in the manner of a funnel toward the deepest point of the parts container or toward the bottom side.

The discharging unit can be, for example, a slider that has a discharge bearing face. The slider in the first position forms the bottom side, or a subarea of the bottom side respectively, for bearing the workpiece part, and in the second position is laterally displaced such that the discharge bearing face in the second position can be arranged outside the bottom side of the receiving unit so that an opening through which the workpiece part can be discharged from the receiving unit downward is formed in the bottom side. In particular, two sliders can be provided in the base region which can be displaced in a synchronous and opposing manner from the first position to the second position such that the spacing of said sliders in the second direction is enlarged and an opening through which the workpiece part can be discharged is formed between the two sliders. Alternatively to the use of sliders for discharging the workpiece part, the discharging unit can be configured, for example, as a pivotable flap which in the first position serves for bearing the workpiece part and is aligned in a (substantially) horizontal manner, and in the second position is typically pivoted downward so as to uncover an opening at the bottom side of the receiving unit. Two flaps which are pivoted from the first position to the second position in a synchronous manner so as to discharge the workpiece part downward can also be provided as the discharging unit, for example.

In some embodiments, the machine includes at least one support slide which is displaceable in the second direction in the gap and which has a bearing face for supporting workpiece parts that are cut during separative machining. The support slide and/or the workpiece bearing face of the support slide are/is lowerable relative to the support slide, for example, below a workpiece bearing plane that is formed by the workpiece bearing face(s). As is described in DE 10 2013 226 818 B4, the entire content of which is incorporated in this application by reference, during separative machining, in particular when cutting free, a workpiece part can be supported by the support slide, or by the bearing faces of the support slides, for example, to prevent falling of said workpiece part, after having been cut free, into the gap in an uncontrolled manner. Moreover, a workpiece part that bears on the bearing face or the bearing faces, by way of the controlled lowering of the bearing face(s), or of the support slide(s) conjointly with the bearing faces can be released in an ideal manner from the residual workpiece without canting. The movement of the parts chute from the first to the second position can in particular be performed so as to be temporally parallel with the lowering of the support slide(s) below the workpiece bearing plane.

In a further embodiment the machine comprises a control unit which is configured or programmed for moving the receiving unit in a controlled manner to the transfer position as well as to the different discharge positions of the machine in the second direction. The control unit in addition to the receiving unit typically also controls the movement of the parts chute and the discharging unit between their respective first and second positions. It is understood that the control unit can be configured for controlling further components of the machine, in particular the components described below. The control unit for this purpose acts on a respective actuator or drive that enables the movement of the component. The control unit can thus for example act on a pneumatic cylinder or the like which enables the movement of the parts chute between the first position and the second position.

In a refinement the control unit is configured or programmed for arranging two support slides so as to be adjacent to each other in order to support a workpiece part when the latter is cut free, and for enlarging a spacing between the two support slides in the second direction in order to allow the workpiece part to drop into the gap. In this case, the workpiece part when being cut free bears on at least one, typically on both, bearing faces of the support slides. Since processing of the workpiece when cutting free is typically performed in a cutting region that is formed between the two support slides, the two support slides can be arranged to be adjacent to each other in the gap, though are optionally not directly adjacent to each other. An arrangement of the two support slides adjacent to each other in the gap can be an arrangement of the support slides at a minor spacing of typically approximately 5 mm in the Y-direction. It is understood that the two support slides when the workpiece is being cutting free, can also be directly mutually adjacent provided that said support slides have two mutually opposite clearances in the bearing faces in which cutting free can be performed, as is described, for example, in DE 10 2013 226 818 B4.

The spacing between the two support slides is enlarged in order to allow the cut-free workpiece part to drop into the gap. The spacing between the support slides is typically enlarged so far that the cut-free workpiece part loses the support by the bearing faces of the support slides and drops downward between the support slides. The enlargement of the spacing can be performed by a synchronous opposing and symmetrical movement of the two support slides, that is to say that said support slides are separated at an identical (and typically high) speed or acceleration such that the workpiece part is ideally not laterally displaced in the enlargement of the spacing and drops into the gap in a free fall.

It is understood that there are also other possibilities for allowing the cut-free workpiece part to drop into the gap. For example, the cut-free workpiece part can bear only on the bearing face of one support slide that by way of a dynamic movement is displaced in the Y-direction, on account of which a movement of the support slide relative to a workpiece part that bears on the bearing faces is generated. The workpiece part cannot follow the dynamic movement of the support slide so that when the support slide is displaced to get laterally offset relative to the workpiece part the workpiece part drops into the gap. One or a plurality of support slides and/or the bearing faces thereof can also be downwardly pivotable in order to allow the cut-free workpiece part to drop into the gap.

In a further refinement the control unit is configured or programmed to determine the transfer position of the receiving unit so as to depend on a center of gravity position of the workpiece part along the second direction when the workpiece part is cut free. The transfer position can coincide with that position at which the workpiece part departs from the parts chute. Provided that the workpiece part when cutting free does not undergo any lateral offset in the second direction, the transfer position of the receiving unit substantially coincides with the center of gravity position of the workpiece part. In this case, the receiving unit in the transfer position can be arranged in the second direction so as to be centrical in relation to the center of gravity position.

A lateral offset of the workpiece part in the second direction relative to the original position of the workpiece part across the gap at the point of time of cutting the workpiece part free typically arises along the path of the workpiece part between the latter being cut free and the departure of the latter from the parts chute. The lateral offset depends inter alia on the length of the path that is covered by the workpiece part on the parts chute, on the manner of dropping or releasing the workpiece part into the gap, for example by the support slide(s), and on the impact of the workpiece part on the parts chute in which a force in the second direction can optionally be exerted on the workpiece part. This lateral offset leads to a spread of the positions in the second direction at which the cut-free workpiece part departs from the parts chute. The discharging unit should have a certain extent along the gap in order to be able to compensate for the spread of the positions of the workpiece parts when departing from the parts chute, and in order to catch all workpiece parts. Since the lateral offset of the workpiece parts from the center of gravity position in the second direction typically arises to an identical degree in the positive as well as in the negative Y-direction, the receiving unit for receiving the workpiece part is typically arranged such that the transfer position is located in the center of the longitudinal extent of the receiving unit in the Y-direction.

In some embodiments, the control unit is configured to determine the transfer position of the receiving unit based on a spacing between the center of gravity position of the cut-free workpiece part and a central position of the mutually facing edges of the bearing faces of the two support slides that are arranged adjacent to each other when the workpiece part is cut free. As has been described above, the receiving unit should not have an excessive extent in the second direction since this leads to an increase in the weight of the receiving unit and therefore reduces the dynamic behavior of the displacement movement of the receiving unit in the second direction.

Instead of an enlargement of the extent of the receiving unit in the second direction, the discharging unit can be proactively positioned such that a (deterministic) lateral offset of the workpiece part in the second direction is compensated for. Such a substantially deterministic lateral offset can arise, for example, when the workpiece part has been cut-free and is bearing on the bearing faces of support slides, a spacing between the two support slides is enlarged to let the workpiece part drop into the gap, and when the center of gravity position of the workpiece part does not coincide with the central position between the bearing faces.

In this case, the position of the workpiece part, more specifically a spacing between the center of gravity position of the workpiece part and a central position of the mutually facing edges of the bearing faces of the two support slides that are arranged adjacent to each other when the workpiece part is cut free, has an effect on the lateral offset of the workpiece part when the latter is discharged through the gap. The workpiece part is entrained in the second direction by the support slide or the support slides due to the enlargement of the spacing or on the account of the separating movement of the support slides and the friction force between the respective bearing face and the workpiece part bearing thereon. Should a workpiece part, prior to the support slides being separated, only bear on the bearing face of a support slide not in an exactly centric manner but, for example, by way of a majority of the face of said workpiece part, said workpiece part is entrained or conjointly moved in the displacement direction (positive or negative Y-direction) of said support slide. A lateral offset which is relative to the original position of the workpiece part when the latter is cut-free and which the workpiece part will presumably have when departing from the parts chute can therefore be determined by means of the position of such a workpiece part relative to the edge of the bearing face of the support slide. In order for the workpiece part to be securely received, the receiving unit while taking into account said lateral offset that is expected, can therefore be positioned at a suitable transfer position at which the workpiece part will presumably depart from the parts chute.

The mutually facing edges of the bearing faces of the two support slides are not mandatorily aligned so as to be parallel with the first direction but said mutually facing edges can also be aligned in particular at an angle, that is to say so as to be oblique, in relation to the first direction and to the second direction. The central position between the mutually facing edges of the bearing faces in the second direction is in this case typically measured at a centric location of the bearing faces in the first direction, that is to say typically in the center of the gap.

Should a workpiece part bear substantially only on the bearing face of one of the two support slides, said workpiece part in the movement of said support slide is entrained either in the positive or in the negative Y-direction. In this case, the transfer position can be determined, for example, in that the spacing between the center of gravity of the workpiece part and the central position is calculated, and the transfer position, proceeding from the central position, is offset laterally in the positive or negative Y-direction by double of said spacing, in order for the workpiece part to be caught with the aid of the receiving unit. It is understood that in addition to the center of gravity position of the workpiece part, further geometric properties of the workpiece part can optionally also be taken into account in order for the lateral offset of a workpiece part when discharging through the gap to be precisely determined. For example the (maximum) dimension in the X-direction and in particular in the Y-direction of said workpiece part can be taken into account.

In some embodiments, the machine has a suction box which is arranged in the gap below a workpiece bearing plane. The suction box is typically connected to a blower and serves for suctioning cinder and gases that are formed when cutting from a suction region that is formed in the suction box. The suction region in the suction box is typically closed on all sides so as to prevent the egress of cinder, gas, or smoke, and so as to optimize the suction performance, said suction region having an opening only towards the top, leading to the gap or to the workpiece bearing plane. As has been described above, the parts chute is moved from the first to the second position in the gap so as to convey workpiece parts in the form of good parts from the suction region, or from the gap. The chute face of the parts chute in the second position protrudes into the suction region of the suction box. It is favorable for the suction box to remain closed when the parts chute is in the first, that is to say for the suction box in the first position to remain sealed in relation to the environment. There are a plurality of possibilities for moving the parts chute from the first to the second position (and vice versa).

In one embodiment, the parts chute is pivotable and/or displaceable from the first position to the second position, wherein the parts chute in the first position preferably forms a portion of a side wall of the suction box. The parts chute in the second position, and thus the chute face thereof, protrudes into the gap and typically encloses an angle with the bearing faces. The angle is chosen such that workpiece parts that drop into the gap can be moved along the chute face to a location that can be laterally next to the gap.

In order for the parts chute to be moved from the first position to the second position, or vice versa, the parts chute can be pivoted about a joint, for example, to which end an actuator, or actuators, in the form of pneumatic cylinders can be used, for example. When the parts chute is pivoted between the first position and the second position, the parts chute can have a wedge-shaped cross section, for example. The parts chute at the wide end of the wedge-shaped cross section can have shaft stubs on both sides, said shaft stubs being rotatably mounted on the main body of the machine. The parts chute in the first position can be aligned so as to be substantially vertical, for example, such that said parts chute does not protrude into the gap or into the suction region. In this case, the parts chute in the first position can form a side wall of the suction box so as to close said suction box in a sealing manner in the first position.

Alternatively to pivoting, the parts chute can be displaced in a linear manner from the first position to the second position, for example in the horizontal direction (e.g., in the second direction) or in a direction that is inclined in relation to the horizontal direction. In this case, the parts chute, in addition to the chute face, can have a wall portion which runs adjacent to the chute face in the vertical direction, for example, and which in the first position forms the side wall of the suction box. The suction box in this case typically has an opening through which the chute face of the parts chute can be moved from the first position outside the suction box to the second position within the suction box. In order for the sealing effect to be optimized, seals against which the parts chute is pivoted or displaced when closing, said parts chute therefore sealing the suction region, can be attached on all sides about the opening of the suction region which is closed by the parts chute in the first position.

In one refinement the suction box is displaceable in a direction that is transverse to the gap, that is to say typically in the X-direction and/or in the vertical direction. This is favorable in particular in the case of the parts chute not forming any portion of a side wall of the suction box, since it can typically be likewise ensured that the suction region in the suction box during cutting is sealed in relation to the environment by displacing the suction box. The movement of the parts chute can be coupled to the movement of the suction box, or can be performed independently of the latter. The parts chute for a conjoint movement can be rigidly fastened to the suction box, for example. It is optionally possible for the suction box to be tilted so as to enable the movement of the parts chute from the first to the second position (and vice versa).

In some embodiments, the parts chute extends along the entire length of the gap in the second direction. In some embodiments, it is favorable to have only a single parts chute to be used for discharging workpiece parts at arbitrary positions in the second direction. Alternatively, two or more parts chutes can optionally be disposed beside one another in the second direction, said parts chutes being able to be moved independently of one another from the first position to the second position (and vice versa). The control complexity is however typically increased in this case, since optionally two neighboring parts chutes have to be moved in a synchronous manner from the first to the second position (and vice versa) in order for workpiece parts, which are cut free close to a transition between two neighboring parts chutes, to be discharged.

In some embodiments, the parts chute has at least one damping layer for damping the impact of cut-free workpiece parts on the chute face. The chute face of the parts chute can be formed, for example, in the form of a structured metal sheet, for example from stainless steel, so as to facilitate the sliding of the workpiece parts, to avoid damage to the workpiece parts, and to reduce the wear on the parts chute. In these embodiments, at least one damping layer, or a damping intermediate tier, which reduces the generation of noise by dropping workpiece parts and damps the impact of the dropping workpiece parts and in this manner assists in avoiding damage to the workpiece parts, is attached below the chute face which can be formed on the metal sheet, for example. Copper sheets can be fitted to the rear side of the parts chute, that is to say to that side that faces away from the chute face, the task of said copper sheets being to avoid cinder adhering thereto, provided that the parts chute in the first position forms a portion of the side wall of the suction box. The parts chute can optionally be configured in the manner of a conveyor belt, that is to say the chute face forms part of the conveyor belt, and the workpiece part is moved conjointly with the chute face by the drive of the conveyor belt such that the chute face can be disposed in a manner that is less steep.

A further aspect of the invention relates to a method of the type mentioned at the outset, said method being in particular capable of being carried out on the machine described above, said method includes: moving a parts chute from a first position to a second position, wherein the parts chute in the first position does not protrude into a gap between two workpiece bearing faces for bearing the workpiece, or at least does not protrude into a movement range of the processing beam in the gap, and wherein a chute face of the parts chute in the second position is arranged in the gap so as to move a workpiece part that is cut free from the workpiece and drops into the gap laterally next to the gap; receiving the workpiece part by the receiving unit at a transfer position next to the gap; displacing the receiving unit along the gap for transporting the received workpiece part to a discharging position along the gap; and discharging the workpiece part from the receiving unit at the discharging position. The method can in particular be carried out on the machine described above, said machine being, for example, a laser processing machine. The parts chute in the first position at least does not protrude so far into the gap that the path of the processing beam in the gap is influenced or obscured by the parts chute, that is to say the parts chute in the first position is disposed outside the movement range of the processing beam such that the parts chute in the first position is not hit by the processing beam.

In one variant the method additionally includes disposing two support slides that are displaceable within the gap so as to be adjacent to each other in the gap for supporting the workpiece part when the latter is cut free at a cutting-free position, typically between the support slides; and enlarging a spacing between the two support slides for dropping the cut-free workpiece part into the gap. As has been described above, the support slides and/or the bearing faces relative to the respective support slides can be preferably lowered below a workpiece bearing plane that is formed by the workpiece bearing faces. The lowering movement of the support slides can be performed prior to or optionally during the enlargement of the spacing between the two support slides. The workpiece part can be ejected from the workpiece, or from the sheet skeleton of the workpiece by lowering the support slides.

In one variant the transfer position of the receiving unit is determined based on a center of gravity position of the workpiece part along the second direction when the workpiece part is cut free. The transfer position can coincide with the center of gravity position of the workpiece part, with the central position between the two edges of the bearing faces of two support slides that are arranged adjacent to each other, or optionally with the cutting-free position. In particular, when the workpiece part is allowed to drop into the gap by an enlargement of the spacing between two support slides, it has proven favorable for a lateral offset to be performed between the central position and the transfer position, provided that the workpiece part does not bear on the bearing faces so as to be completely centric in relation to the central position.

In one variant the transfer position of the receiving unit is determined based on a spacing between the center of gravity position of the cut-free workpiece part and a central position between the mutually facing edges of the bearing faces of the two support slides which are arranged adjacent to each other so as to be adjacent when the workpiece part is cut free. As has been described above, in this way the transfer position can be chosen in such a manner that the receiving unit is ideally located at that position where it is to be expected that the workpiece part makes its way from the chute face so as to be laterally next to the gap.

Further advantages of the invention are derived from the description and from the drawing. Likewise, the above-mentioned features and those yet to be set forth can be used individually or in multiple arbitrary combinations with one another. The embodiments shown and described are not to be understood as an exhaustive enumeration but rather have an exemplary character in order for the invention to be visualized.

DESCRIPTION OF DRAWINGS

FIGS. 2A and 2B also show an illustration of a receiving unit in the form of a collection carriage that is displaceable parallel to the gap.

Identical reference signs are used for the same components, or for components of equivalent function, respectively, in the following description of the drawings.

DETAILED DESCRIPTION

Figure 1:
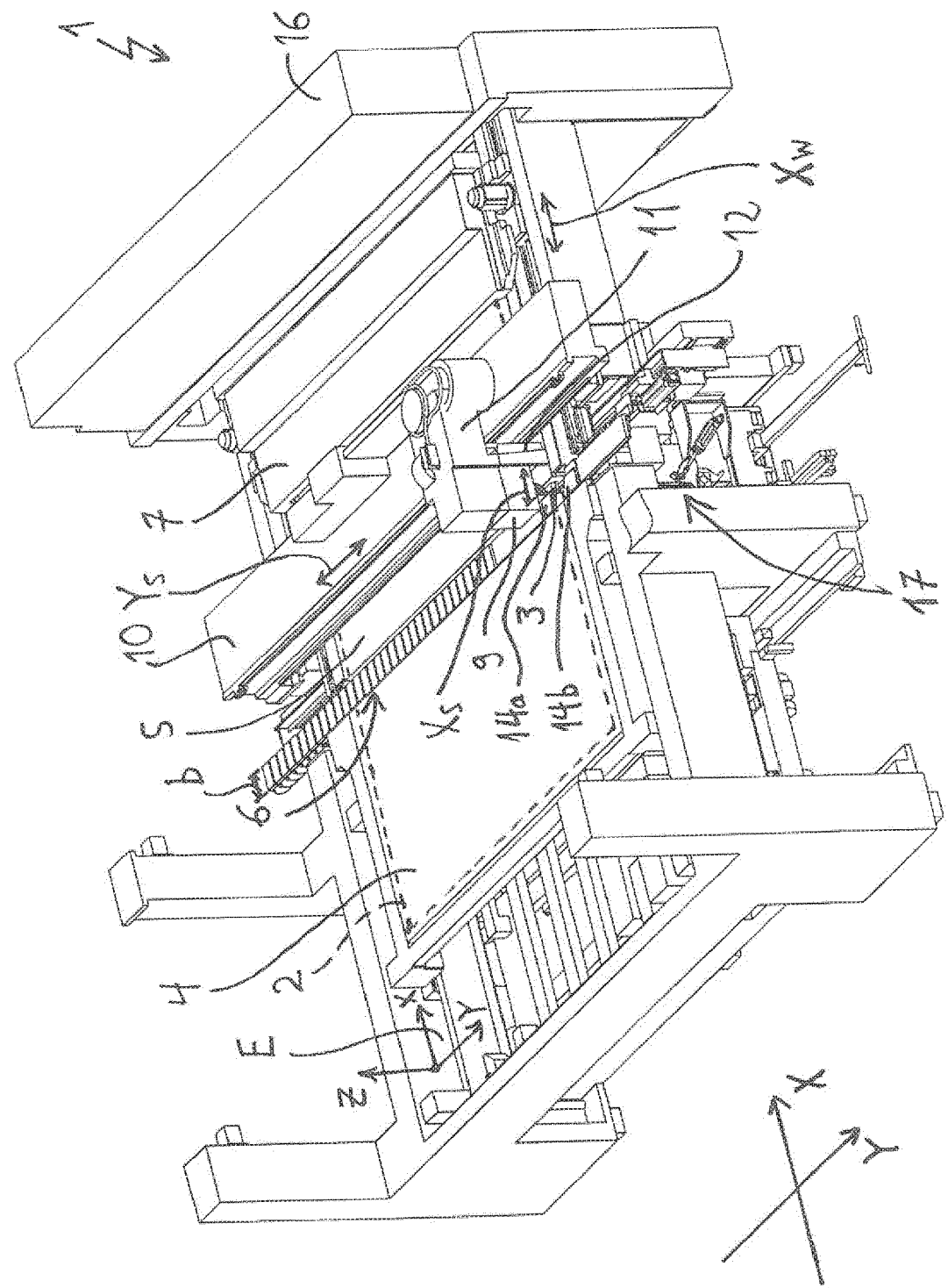
FIG. 1 shows a schematic illustration of an exemplary embodiment of a machine for separative machining of a plate-shaped workpiece in the form of a laser cutting machine that has a gap that is formed between two workpiece bearing faces.

FIG. 1 shows an exemplary construction of a machine 1 for separative machining, more specifically for laser cutting, of a plate-shaped workpiece 2 (illustrated in dashed lines) by means of a processing beam in the form of a laser beam 3 which is produced by a laser source not specified here. In order for the workpiece 2 to be cut, another type of thermal processing beam, for example a plasma jet or a water jet, can also be used instead of the laser beam 3. The workpiece 2 when being processed bears on two stationary workpiece bearing faces 4, 5 (or workpiece bearing supports) which in the example shown form the upper sides of two workpiece tables and define a workpiece bearing plane E (X-Y plane of a XYZ coordinate system) for bearing the workpiece 2. The workpiece bearing faces 4, 5 can be formed by table faces or by pin-shaped bearing elements (pins), bearing belts, brushes, rollers, balls, air cushions, or the like.

The workpiece 2 by means of a conventional motion and holding unit (or movement drive) 7 which has a drive and clamping installations in the form of clamping jaws for fixedly holding the workpiece 2 can be displaced in a controlled manner in a first direction X (hereunder: X-direction) on the workpiece bearing faces 4, 5 and be moved to a predefined workpiece position $X_W$. In order for the movement of the workpiece 2 in the X-direction to be facilitated, brushes, balls, or slide rollers which represent the actual workpiece bearing faces 4, 5 can be attached to the workpiece tables shown in FIG. 1. Alternatively, in order for the workpiece 2 to be moved in the X-direction, or in order for said movement of the workpiece 2 to be supported in the X-direction, it is possible for example for the workpiece bearing faces 4, 5 per se to be designed as a motion unit, for example in the form of a (revolving) conveyor belt as is described in DE 10 2011 051 170 A1 of the applicant, or in the form of a workpiece bearing as is described in JP 06170469.

A gap 6 that is laterally delimited by the stationary workpiece bearing faces 4, 5 is formed between the two stationary workpiece bearing faces 4, 5. The gap 6 extends in a second direction (hereunder: Y-direction) along the entire width of the two workpiece bearing faces 4, 5. A laser cutting head 9 which directs and focuses the laser beam 3 onto the workpiece 2 is displaceable in a controlled manner in the Y-direction by means of a driven slide 11 which serves as a movement unit (or movement drive) and which is guided on a stationary gantry 10. The laser cutting head 9 in the example shown is additionally also displaceable in the X-direction and, with the aid of an additional movement unit 12, for example in the form of a linear drive, that is attached to the slide 11 can also be displaced in a controlled manner in the X-direction.

The laser cutting head 9 with the aid of the mutually complementary movement units 11, 12 can be positioned both in the X-direction as well as in the Y-direction at a desired cutting head position XS, YS within the gap 6.

Two support slides 14a, 14b are disposed in the gap 6 shown in FIG. 1 in order to additionally support the workpiece 2 and in order to support workpiece parts that are cut during separative machining. The two support slides 14a, 14b extend in each case across the entire width b of the gap 6 and are displaceable in a controlled and mutually independent manner in the Y-direction in the gap 6. The controlled movement of the support slides 14a, 14b along the lateral edges of the stationary workpiece bearing faces 4, 5 can be performed with the aid of spindle drives, for example, wherein the spindle nut is attached to the respective support slide 14a, 14b and the spindle as well as the drive motor are attached to one of the two stationary workpiece bearings 4, 5. It is understood that the controlled movement of the support slides 14a, 14b can also be implemented in another way.

The support slides 14a, 14b can in each case be moved along the second Y-direction to a desired position $Y_{UA}$, $Y_{UB}$ in the gap 6, so as to there support the workpiece 2, more specifically to support workpiece parts that are to be cut-free from the workpiece 2, or have been cut when machining, by means of a bearing face 15a, 15b. The bearing face 15a, 15b is installed at the respective support slide 14a, 14b, as can be better seen in FIGS. 2A and 2B. In the case shown, the bearing face 15a, 15b of a respective support slide 14a, 14b terminates in the Z-direction so as to be flush with the workpiece bearing faces 4, 5, that is to say that the bearing faces 15a, 15b of the support slides 14a, 14b are located in the bearing plane E for the workpiece 2. The bearing faces 15a, 15b can have a first subarea made of a heat-resistant material as well as a second subarea that adjoins the first subarea and can be configured as a brush bearing, for example.

The movement of the support slides 14a, 14b can be performed in a synchronous manner, that is to say that the spacing between the position $Y_{UA}$ of the first support slide 14a and the position $Y_{UB}$ of the second support slide 14b in the second (Y) direction can be constant during the movement. The movement of the first support slide 14a can also be performed independently of the movement of the second support slide 14b, that is to say that the spacing between the position $Y_{UA}$ of the first support slide 14a and the position $Y_{UB}$ of the second support slide 14b can vary during the movement in the Y-direction, as will be described in more detail below.

Figure 2A:
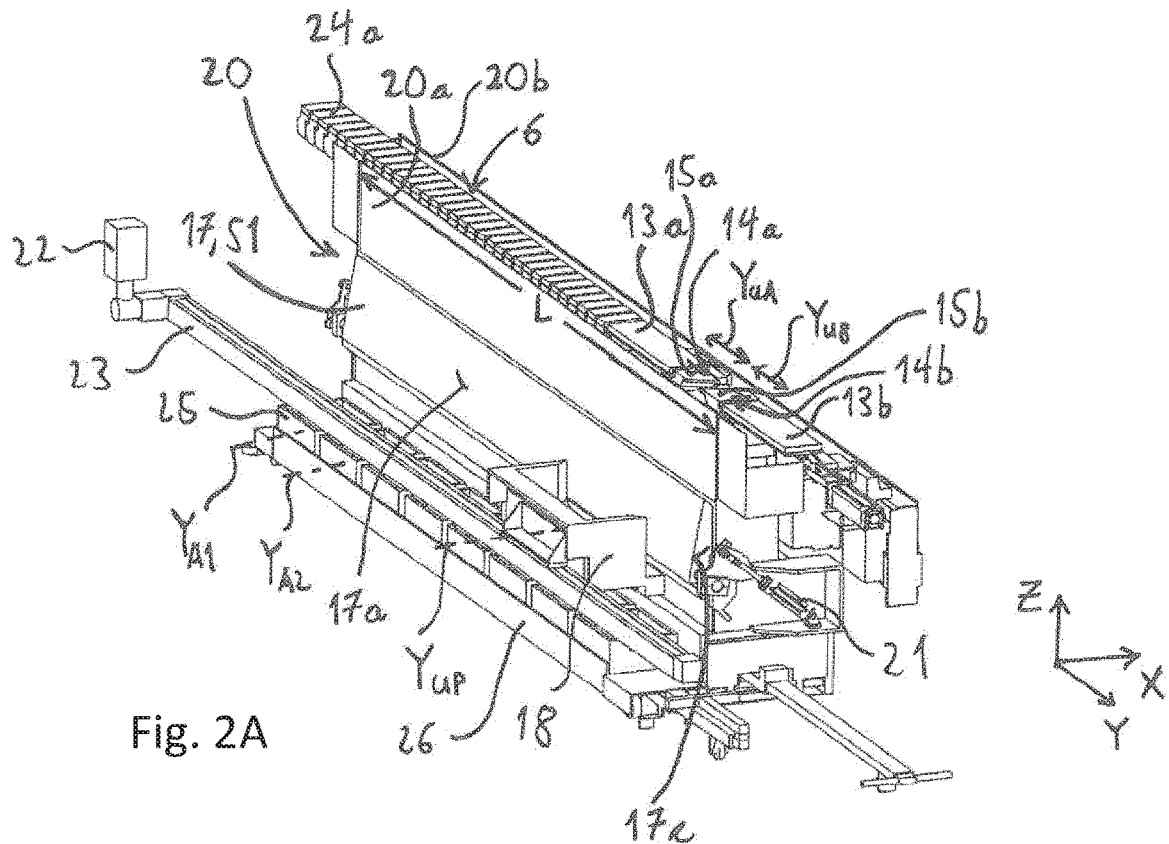
FIGS. 2A and 2B show a detailed illustration of the machine of FIG. 1, having a parts chute that extends along the gap. The parts chute as shown in FIG. 2A is arranged in a position outside the gap, that is to say does not protrude into said gap, and as shown in FIG. 2B is arranged in a position that is pivoted into the gap.
Figure 2B:
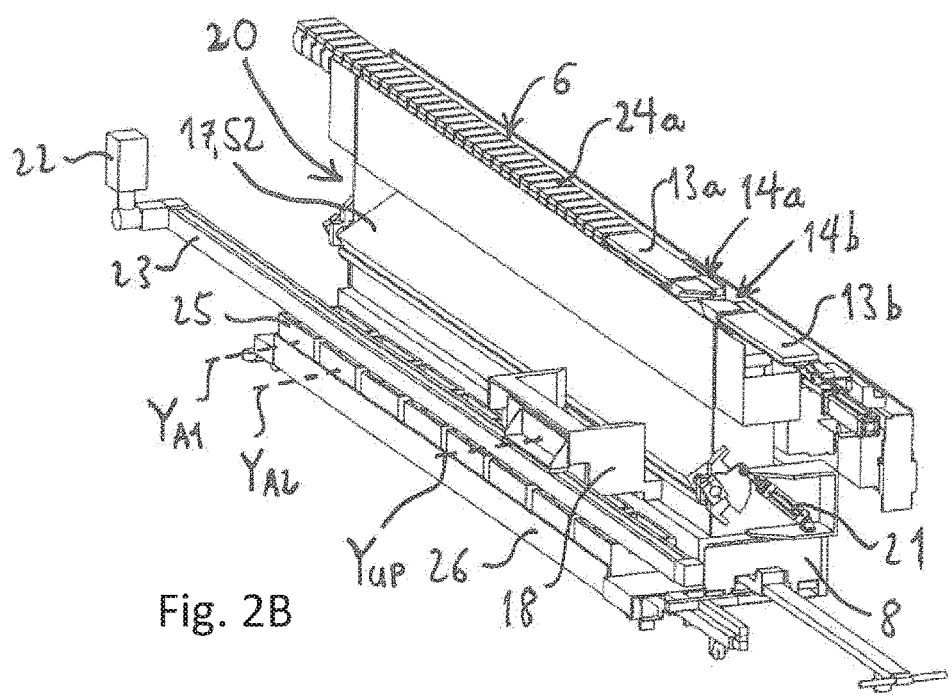

In the example shown in FIG. 2, in each case one support element 13a, 13b and one covering element 24a, 24b (of which only a first covering element 24a is shown in FIGS. 2A and 2B) for covering the gap 6 between the two workpiece bearing faces 4, 5 are attached to the support slides 14a, 14b, more precisely to the lateral edges of the bearing faces 15a, 15b, said lateral edges running in the X-direction and facing away from one another. The support elements 13a, 13b and the covering elements 24a, 24b extend across the entire width b of the gap 6, and are conjointly moved with the movement of the support slides 14a, 14b in the Y-direction. The covering elements 24a, 24b in the example shown are configured in the manner of roller blinds, but can also be configured in another manner, for example so as to be telescopic, imbricated, as a rolled-up belt, etc. The upper side of the support elements 13a, 13b and the covering elements 24a, 24b are level with the bearing faces 15a, 15b of the support slides 14a, 14b, or with the workpiece bearing faces 4, 5. The support elements 13a, 13b and the covering elements 24a, 24b serve for bearing subareas of the (residual) workpiece 2 that protrude into the gap 6 and are not rigid in flexural terms and without such a bearing could potentially collide with the support slides 14a, 14b.

For controlling the cutting machining, the machine 1 has a control unit 16 (or controller) which is illustrated in FIG. 1 and which serves for coordinating the movements of the workpiece 2, of the laser cutting head 9, as well as of the support slides 14a, 14b so as to set a desired workpiece position $X_W$, a desired cutting head position $X_S$, $Y_S$, and a desired position $Y_{UA}$, $Y_{UB}$ of the support slides 14a, 14b, so as to enable the cutting of a predefined cutting contour, and for supporting the workpiece 2 close to the gap 6 if required. The control unit 16 in the example shown also serves for moving a parts chute 17 shown in FIGS. 2A and 2B in a controlled manner as well as a receiving unit 18 in the form of a collection carriage for receiving workpiece parts from the parts chute 17.

The parts chute 17 is shown in FIG. 2A in a first vertical position S1 (first chute position) in which the parts chute 17 does not protrude into the gap 6, such that scrap parts, cutting waste, and cinder that is created in the cutting process drop into a suction box 20 that is disposed below the workpiece bearing plane E in the gap 6. A displaceable collection tub 8 in which the cutting waste and scrap parts accumulate and which for emptying can be pulled out of the machine 1 is disposed in the suction box 20. The suction box 20 is connected to a blower so as to suction the cinder, gases, and smoke from a suction region that is formed within the suction box 20. As can likewise be seen in FIGS. 2A and 2B the suction box 20 closes the suction region and can be largely tight in relation to the environment, that is to say that the suction box 20 has only one opening upwards toward the workpiece bearing plane E, said opening being largely covered by the covering elements 24a, 24b as well as by the support slides 14a, 14b. As can be seen in FIGS. 2A and 2B, the suction box 20 has a first vertically running side wall 20a as well as a second vertically running side wall 20b, the suction region located therebetween. The parts chute 17 in the first position shown in FIG. 2A, more specifically the rear side 17b of the parts chute 17 that faces away from the chute face 17a, forms a portion of the first vertical sidewall 20a of the suction box 20, while the second vertical side wall 20b of the suction box 20 is configured so as to be integral. The walls 20a, 20b and the base of the suction box 20 can be interconnected or can be composed of separate components which are sealed in relation to one another.

The parts chute 17 in the second position S2 thereof (second chute position) shown in FIG. 2B is pivoted into the gap 6 such that workpiece parts that are formed in the cutting of the workpiece 2 and drop into the gap 6 or into the suction region impact the parts chute 17, more specifically the chute face 17a of the latter. The chute face 17a of the parts chute 17 in the second position S2 is disposed at an angle in relation to the workpiece bearing plane E such that workpiece parts that impact the chute face 17a under the effect of gravity slide along the chute face 17a, can be removed laterally from the gap 6, and can be received by the collection carriage 18 that is arranged laterally next to the gap 6.

In the machine 1, an actuator in the form of a pneumatic cylinder 21 is provided for pivoting the parts chute 17 from the first position S1 to the second position S2 and vice versa, said pneumatic cylinder 21 being displaceable between a first terminal position in which the parts chute 17 assumes the first position S1, and a second terminal position in which the parts chute 17 assumes the second position S2. It is understood that the drive for the movement of the parts chute 17 can also be implemented in another manner.

The movement of the parts chute 17 from the first position S1 to the second position S2 is typically performed only at the point in time at which the completion of the cut is performed, that is to say as soon as the workpiece part has been cut free from the (residual) workpiece, and the laser beam 3, more specifically the laser source for generating the laser beam 3, has been switched off. The parts chute 17 can be pivoted from the first position S1 to the second position S2, wherein a lowering movement of the two support slides 14a, 14b below the workpiece bearing plane E is performed in parallel therewith. This lowering movement of the support slides 14a, 14b enables a workpiece part that has been cut free from the (residual) workpiece 2 to be ejected. The workpiece part 2a drops onto the parts chute 17 due to a subsequent opposing outward movement of the support slides 14a, 14b. Wiper elements (for example brushes which are not visible in the images) can be disposed on the lower side of the support elements 13a, 13b, said wiper elements in a movement of the support slides 14a, 14b below the support elements 13a, 13b pushing the workpiece part 2a from the support slides 14a, 14b.

In some examples, the pivoting of the parts chute 17 is typically performed only once the laser beam 3 has been switched off, so as to minimize any contamination of the parts chute 17, or so as to prevent the egress of cutting waste, gas, or smoke from the suction box 20, respectively, when the parts chute 17 is moved from the first position S1 to the second position S2 and an opening in the suction box 20 is uncovered. Depending on the type, the size, and the arrangement of the workpiece part 2a to be discharged, the movement of the parts chute 17 to the second position S2 can commence prior to or during the last separation cut, so as to reduce the time required for discharging the workpiece parts 2a.

In order for the earliest possible point in time at which the parts chute 17 can be pivoted from the second position S2 back to the first position S1 to be identified, a sensor unit (not illustrated) that identifies at which point in time a workpiece part departs from the parts chute 17 can be used. For this purpose, the sensor unit can for example have one or a plurality of light barriers, or a light grid so as to detect the egress of the workpiece part from the suction region that is formed in the suction box 20. When said egress is identified, the control unit 16 can trigger the pivoting of the parts chute 17 from the second position S2 to the first position S1. A sensor unit for detecting the workpiece part being caught can optionally also be attached to the collection carriage 18. Alternatively or additionally, the fall time of the workpiece part, that is to say the duration required by the workpiece in order to make its way from the workpiece bearing plane E to the parts chute 17 can be determined. Optionally the duration required by the workpiece for sliding along the chute face 17a of the parts chute 17 and for departing from the latter in the direction toward the collection carriage 18, can be determined. For this purpose, the control unit 16 which serves for controlling the movement of the parts chute 17 can optionally access a database in which respective experimental characteristic data for different workpiece parts, for example for different workpiece geometries, workpiece materials, and workpiece thicknesses, is stored. The pivoting of the parts chute 17 from the second position S2 to the first position S1 can be performed as early as possible so as to be able to resume the cutting process as soon as possible and to optimize the productivity of the machine 1 in this manner. In order for accelerating the conveying of the workpiece part from the parts chute 17, the commencement of the movement of the parts chute 17 from the second position S2 to the first position S1 can optionally already be performed at a point in time at which the workpiece part impacts the parts chute, or the chute face 17a. Since the parts chute 17 in the movement from the second position S2 to the first position S1 is gets into a steeper position, the conveying of the workpiece part can be facilitated by such movement.

As can be seen in FIGS. 2A and 2B the parts chute 17 has an elongate profile having a substantially wedge-shaped cross section. The parts chute 17 at the wide end of the wedge-shaped cross section on both sides has shaft studs that are rotatably mounted on the main body of the machine 1. The chute face 17a of the parts chute 17 in the example shown is formed by a structured stainless steel metal sheet, so as to facilitate the sliding of workpiece parts, to avoid damage to workpiece parts, and to reduce the wear on the parts chute 17. As is indicated in FIG. 2A, a damping layer 17c which forms an intermediate tier and which is intended to reduce the noise generated by dropping workpiece parts is attached under the structured metal sheet that forms the chute face 17a. The impact of the dropping workpiece parts can also be damped by a damping layer 17c of this type, and damage to the workpiece parts can thus be avoided. Copper sheets are fitted to the rear side 17b of the parts chute 17, to prevent cinder from the adhering to the parts chute 17 when the latter is positioned in the first position S1 in which said parts chute 17 closes the suction box 20. The suction box 20 can be sealed by seals against which the parts chute 17 pivots in the movement to the first position S1. The seals can be provided on all sides about the opening of the suction region of the suction box 20 that is closed by the parts chute 17. As can likewise be seen in FIGS. 2A and 2B, in the example shown in FIGS. 3A-3C, the parts chute 17 extends across the entire length L of the gap 6 between the two workpiece bearing faces 4, 5. In this way, it is achieved that the parts chute 17 can receive cut-free workpiece parts at any arbitrary position along the gap 6 and can convey said workpiece parts laterally next to the gap 6.

For the controlled movement of the collection carriage 18 in the second direction Y, the machine 1 has an actuator in the form of a linear drive 22 which enables the collection carriage 18 to be displaced laterally next to the gap along a guide rail 23 (sorting axis) that extends in the Y direction. The collection carriage 18 at a respective transfer position $Y_{UP}$ can in this way receive or catch workpiece parts 2a that have been discharged from the gap 6 at different positions (see FIGS. 3A-3C), and move said workpiece parts 2a to a desired discharging position $Y_{A1}$, $Y_{A2}$, . . . along the gap 6, where (in each case) one collection container 25 in the form of a parts box is disposed. The collection carriage 18 therefore enables for example the workpiece parts 2a discharged from the parts chute 17 to be sorted into different collection containers 25, depending on the size, geometry, etc. of said workpiece parts 2a. As can be seen in FIGS. 2A and 2B the collection containers 25 are arranged in the Y-direction in one row on a box truck 26, the latter enabling the collection containers 25 or the boxes to be retrieved from the machine 1 in that the box truck 26 is moved in the Y-direction so as to empty said machine 1. Accordingly, the collection containers 25 can be fed to the machine 1 by way of a movement of the box truck 26, in order for said collection containers 25 to be positioned laterally next to the gap 6.

Figure 3A:
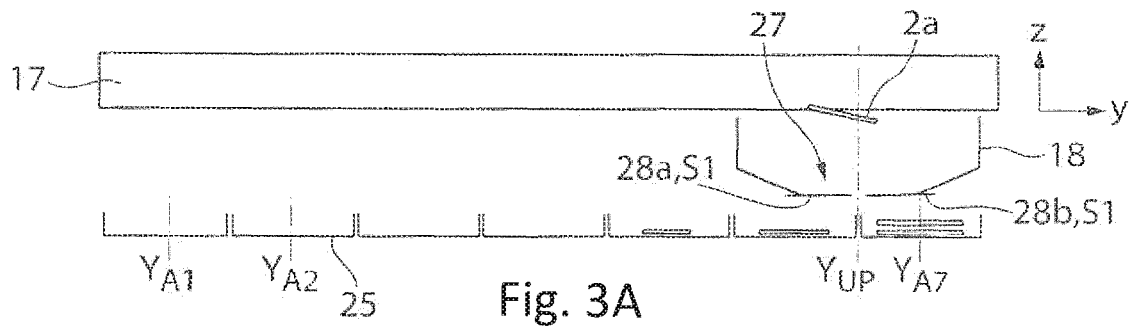
FIGS. 3A-3C show illustrations of a collection carriage in the movement from a transfer position to one of a plurality of discharge positions laterally along the gap, in each case one collection container being disposed at said discharge positions.
Figure 3B:
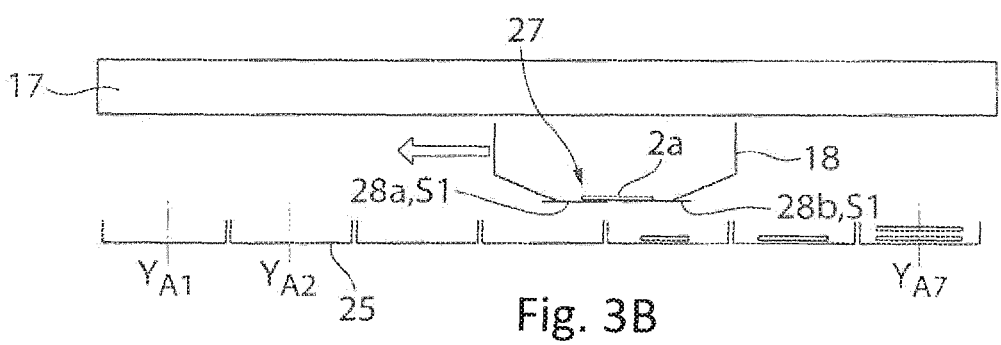
Figure 3C:
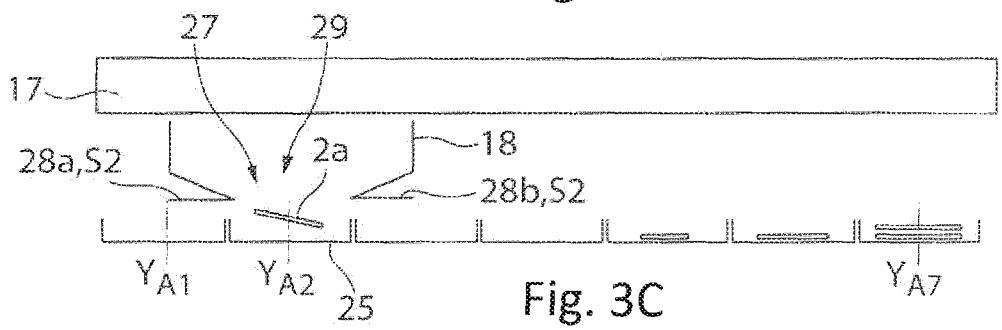

FIGS. 3A-3C in a highly schematic manner show the displacement movement of the collection carriage 18 from the transfer position $Y_{UP}$ at which a workpiece part 2a that has been cut free from the workpiece 2 is received by the collection carriage 18, to a second discharge position $Y_{A2}$ of a total of seven discharge positions $Y_{A1}$, $Y_{A2}$, . . . along the gap 6. A second collection container 25 of the row of collection containers 25 is disposed at the second discharge position $Y_{A2}$. The collection carriage 18 is typically positioned at the transfer position $Y_{UP}$ during the cutting of the workpiece part 2a by means of the laser beam 3, said transfer position $Y_{UP}$ depending on the cutting-free position of the cut-free workpiece part 2a in the second (Y) direction along the gap 6 and thus typically depending on the position of the support slides 14a, 14b.

As has been described above, the cutting of the workpiece 2 can be resumed when the cut-free workpiece part 2a has been caught by the collection carriage 18 or optionally at an earlier point in time. Therefore, the sorting of workpiece parts 2a into different collection containers 25 or boxes with the aid of the collection carriage 18 can be performed in parallel with the main time, that is to say simultaneously with the cutting of the workpiece 2 by the laser beam 3. As is shown in FIGS. 3A-3C, the collection carriage 18 having the received workpiece part 2a first travels for this purpose above a desired collection container 25, that is to say to one of a plurality of discharging positions $Y_{A1}$, $Y_{A2}$, . . . along the gap 6, and ejects the received workpiece part 2a into the respective collection container 25 so that the workpiece part 2a is allowed to drop into the collection container 25.

In order to allow the workpiece part 2a to drop into the collection container 25, the collection carriage 18 at the bottom side 27 thereof has two discharging units (or discharge barriers) which are configured in the form of laterally displaceable sliders 28a, 28b and which are displaceable in the horizontal direction between a respective first position S1 and a respective second position S2. The sliders 28a, 28b in the first position S1 thereof cover a respective subarea of the bottom side 27, and in the second position S2 uncover an opening 29 in that subarea of the bottom side 27 that is covered in the first position S1. In the example shown in FIGS. 3A-3C, the two sliders 28a, 28b are displaced in a synchronous and opposing manner, that is to say in the negative and the positive Y-direction, respectively, from the first position S1 to the second positon S2, on account of which the spacing between the sliders 28a, 28b is enlarged and an opening 29 that extends substantially across the entire bottom side 27 is formed in the bottom side 27, as can be seen in FIG. 3C.

The control unit 16 has a respective drive for the controlled movement of the sliders 28a, 28b from the first position S1 to the second position S2 (and vice versa). It is understood that the discharging unit(s) can also be configured and/or moved in a manner other than shown here. The discharging units(s) can be configured, for example, as downwardly pivotable flaps, in order for the cut-free workpiece part 2a to be discharged. A single slider or a single flap can optionally also be used as a discharging unit instead of two sliders 28a, 28b.

In the case of the examples shown in FIGS. 2A and 2B and in FIGS. 3A, 3B and 3C the collection carriage 18 can be moved only in the Y-direction. However, it is understood that the collection carriage 18 additionally can optionally also be displaceable in the X-direction. In this case, for example, each discharging position $Y_{A1}$, $Y_{A2}$, . . . in the Y-direction can be assigned two or more discharging positions in the X-direction, so as to deposit cut-free workpieces 2a in collection containers 25 that are disposed beside one another in two or more rows in the X-direction. Sorting of workpiece parts 2a into a greater number of collection containers 25 can be performed in this way.

As can likewise be seen in FIGS. 3A-3C the collection carriage 18 has lateral inclines that act in the manner of a funnel so as to channel the cut-free workpiece 2a to the lowest point of the collection carriage 18, that is to say toward the bottom side 27 where the two sliders 28a, 28b are disposed. The discharging of the workpiece part 2a from the machine 1 on account of the enlargement of the spacing between the sliders 28a, 28b is performed in a manner analogous to that of allowing the workpiece part 2a after cutting free to drop into the gap 6, this being described in more detail hereunder by means of FIGS. 4A and 4B.

Figure 4A:
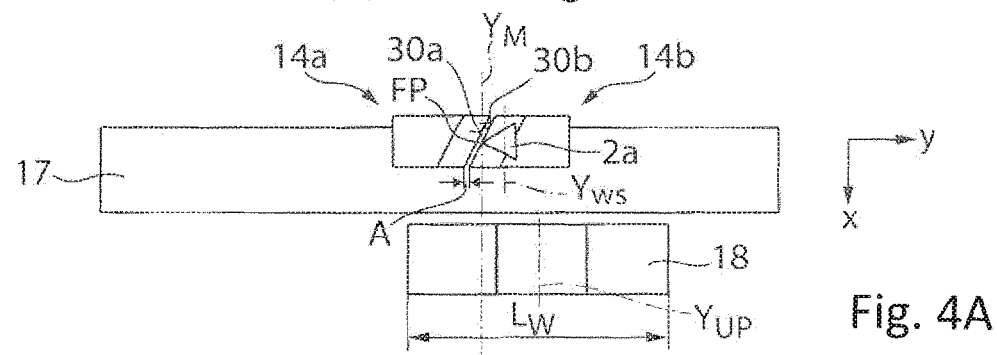
FIGS. 4A and 4B show an illustration of the collection carriage in a transfer position having a lateral offset in relation to a central position between two support slides that are arranged so as to be adjacent to each other in the gap, as well as the spread of the positions of a workpiece part during the transfer into the collection carriage.
Figure 4B:
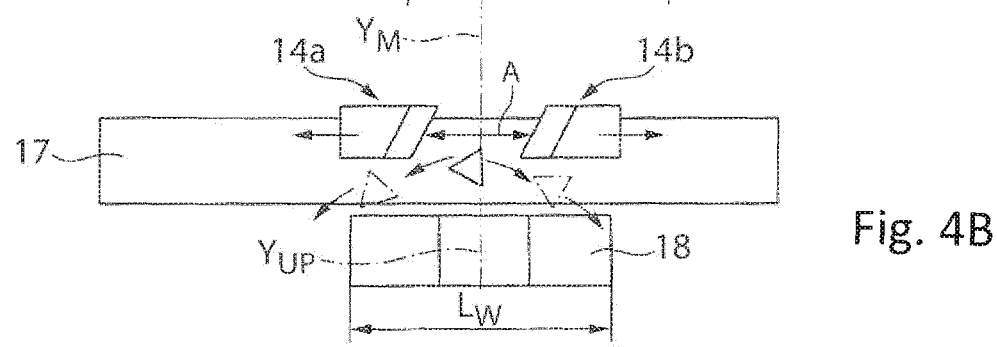

FIG. 4A shows (from above) the two support slides 14a, 14b that for cutting free a workpiece part 2a, which in the example shown is triangular from the (residual) workpiece 2 (not shown in FIGS. 4A and 4B), are arranged mutually adjacent in the gap 6. In the adjacent arrangement, the two support slides 14a, 14b are typically arranged at a spacing A which is approximately 5 mm. A narrow cutting region in which the workpiece part 2a is severed from the (residual)

workpiece 2 with the aid of the laser beam 3 at a cutting-free position FP is thus formed between the two support slides 14a, 14b in this position. After the laser beam 3 has been switched off, the two support slides 14a, 14b in an opposing synchronous movement in the negative and in the positive Y-direction, respectively, are moved from the adjacent position shown in FIG. 4A, on account of which the spacing A between the two support slides 14a, 14b is enlarged, until the cut-free workpiece part 2a drops into the gap 6 between the two support slides 14a, 14b and impacts the parts chute 17 that has been pivoted into said gap 6.

As is indicated in FIG. 4A, the cut-free workpiece part 2a does not necessarily depart from the parts chute 17 at the cutting-free position FP, or close to a central position $Y_M$ between the mutually facing edges 30a, 30b of the two support slides 14a, 14b that are in the adjacent position shown in FIG. 4A. Rather, the position at which the cut-free workpiece part 2a departs from the parts chute 17 can vary in the Y-direction, that is to say that this position has a spread, which typically is not predictable in a deterministic manner. In order for the cut-free workpiece parts 2a to be able to be securely caught, the collection carriage 18 therefore has a length $L_W$ in the Y-direction, which can for example be approximately 50 cm. The length $L_W$ of the collection carriage 18 in the Y-direction should not be chosen so as to be excessive, in order to prevent the collection carriage 18 from having an excessive weight that reduces the dynamic behavior of the movement of the collection carriage 18 when transporting workpiece parts 2a.

It is understood that the collection carriage 18 is ideally to be positioned at a transfer position $Y_{UP}$ in the Y-direction at which the probability of the cut-free workpiece part 2a departing from the parts chute 17 is the highest. If the cut-free workpiece part 2a bears in the Y-direction on the bearing faces 15a, 15b of the support slides 14a, 14b so as to be centric or substantially centric, the transfer position $Y_{UP}$ can coincide with the central position $Y_M$ of the support slides 14a, 14b when cutting free. However, should the cut-free workpiece part 2a bear completely or almost completely on one of the two bearing faces 15a, 15b, it is favorable for a lateral offset to be provided between the central position $Y_M$ and the transfer position $Y_{UP}$, said lateral offset taking into account the spacing $|Y_{WS}-Y_M|$ between the center of gravity position $Y_{WS}$ of the workpiece part 2a in the Y-direction and the central position $Y_M$ of the two support slides 14a, 14b. The transfer position $Y_{UP}$, that is to say the central position of the collection carriage 18 in the Y-direction, can be shifted in relation to the central position $Y_M$ in the Y-direction by double said spacing $|Y_M-Y_{WS}|$, for example.

If the workpiece part 2a bears mainly on the bearing face 15b of the second support slide 14b, for example, the transfer position $Y_{UP}$ is thus laterally offset in the positive Y-direction. By the lateral offset it is taken into consideration that the workpiece part 2a that bears on the bearing face 15b of the second support slide 14b by virtue of friction forces is entrained in the movement of the second support slide 14b in the positive Y-direction, such that said workpiece part 2a is imparted a (substantially deterministic) lateral offset in the Y-direction. It is understood that a lateral offset of the transfer position $Y_{UP}$ in the negative Y-direction can be determined in an analogous manner, provided that the cut-free workpiece part 2a largely bears on the bearing face 15a of the first support slide 14a. It is understood that, alternatively or in addition to the center of gravity position $Y_{WS}$ in the Y-direction, other geometric properties of the workpiece part 2a, for example the maximum length and the maximum width of the workpiece part 2a, can also be taken into consideration in order for the transfer position $Y_{UP}$, or the lateral offset in relation to the central position $Y_M$ of the support slides 14a, 14b to be determined.

Besides the pivoting of the parts chute 17 between the first position S1 and the second position S1 described in the context of FIGS. 2A and 2B, there are also other possibilities for moving the parts chute 17 between the two positions S1, S2, of which in an exemplary manner a plurality of possibilities will be described in more detail in the context of FIGS. 5A and 5B to FIGS. 9A and 9B. FIGS. 5A to 9A show in each case the parts chute 17 in a first position S1, while FIGS. 5B to 9B show in each case the parts chute 17 in a second position S2. The two workpiece bearing faces 4, 5 as well as the second support slide 14b are shown in each case in FIGS. 5A and 5B to 9A and 9B. The cut-free workpiece part 2b bearing on said second support slide in FIGS. 5A to 9A, and said second support slide in FIGS. 5B to 9B having been lowered below the workpiece bearing plane E and relocated in the Y-direction such that the workpiece part 2a drops into the gap 6 and impacts the parts chute 17 that is located in the second position S2, or impacts the chute face 17a of said parts chute 17.

Figures 5A, 5B:
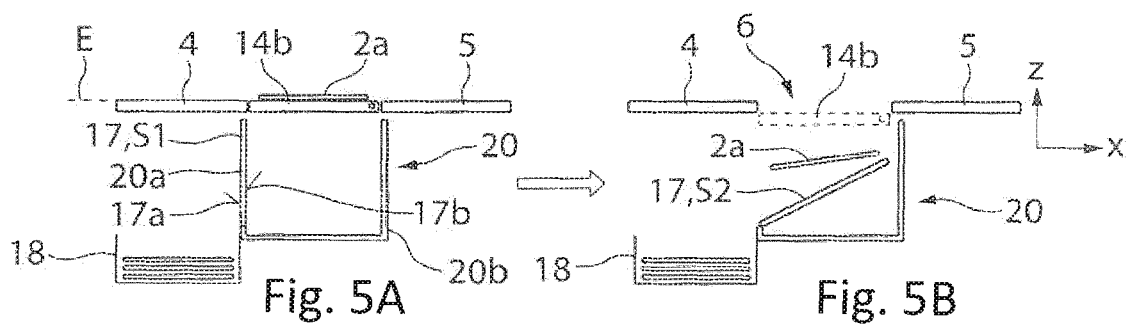
FIGS. 5A and 5B show a schematic view of the cross section of the gap, having a suction box that is disposed in the gap, as well as having the parts chute of FIGS. 2A and 2B in the first position, or in the second position, respectively.

FIGS. 5A and 5B in a manner analogous to FIGS. 2A and 2B show the possibility of pivoting the parts chute 17 between the first position S1 and the second position S2. As opposed to the example shown in FIGS. 2A and 2B the parts chute 17 in the first position S1 forms almost the entire first side wall 20a of the suction box 20. The suction box 20 typically adjoins the respective bearing faces 4, 5 in a flush manner, so as to avoid the egress of cinder, gases, and smoke into the environment.

Figures 6A, 6B:
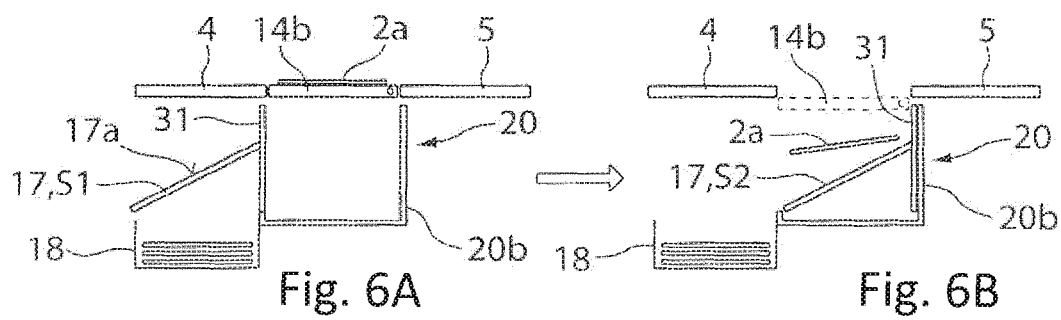
FIGS. 6A and 6B show an illustration analogous to that of FIGS. 5A and 5B, in which the parts chute is displaced in a linear manner in the movement from the first to the second position.

FIGS. 6A and 6B show an example of a linear horizontal movement of the parts chute 17 between the first position S1 and the second position S2. The parts chute 17 in the example shown, in addition to the inclined chute face 17a, has a wall portion 31 which extends in the Z-direction, that is to say vertically, and which in the first position S1 forms the first side wall 20a of the suction box 20. In the second position S2, displaced into the gap 6, the wall portion 31, which extends in the Z-direction, is brought to bear on the second side wall 20b of the suction box 20 such that the cut-free workpiece part 2a can impact the chute face 17a. The inclined part of the parts chute 17 that includes the chute face 17a can be configured so as to be integral to the wall portion 31; however, it is also possible that the part of the parts chute 17 having the chute face 17a and the wall portion 31 are mutually separable components.

Figures 7A, 7B:
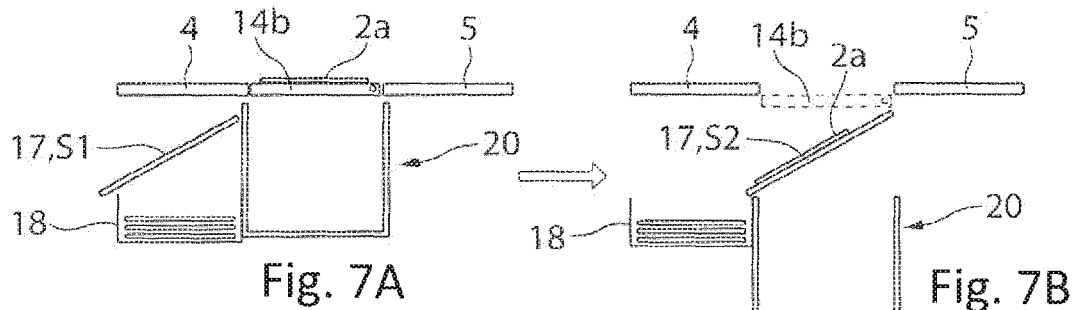
FIGS. 7A and 7B show an illustration analogous to that of FIGS. 5A and 5B, in which the suction box is displaced downward in the movement of the parts chute from the first to the second position.

The parts chute 17 in FIGS. 7A and 7B is displaced in the horizontal direction from the first position S1 to the second position S2 in a manner analogous to FIGS. 6A and 6B. However, the parts chute 17 in this case does not form any portion of the sidewall 20a of the suction box 20, but the suction box 20 is lowered so as to enable the movement of the parts chute 17 from the first position S1 to the second position S2 and vice versa.

Figures 8A, 8B:
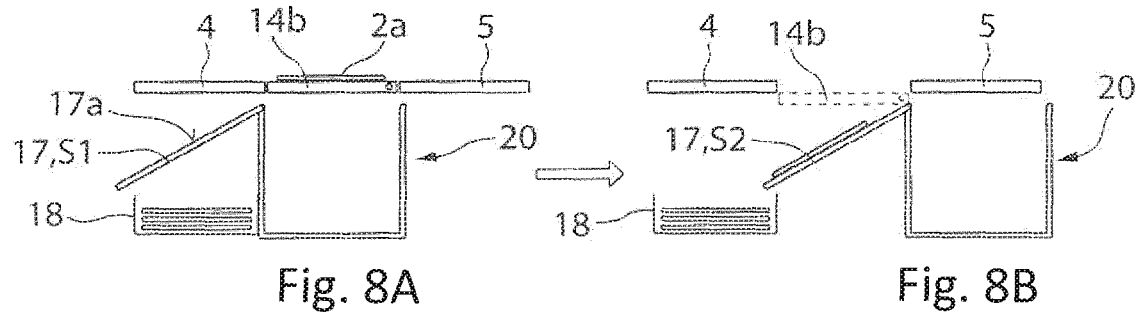
FIGS. 8A and 8B show an illustration analogous to that of FIGS. 5A and 5B, in which the suction box is also laterally displaced in the movement of the parts chute from the first to the second position.

FIGS. 8A and 8B show an example of a linear movement of the parts chute 17, said movement being performed in the X-direction as in FIGS. 6A and 6B and in FIGS. 7A and 7B. The parts chute 17 in the example shown in FIGS. 8A and 8B is fastened to the upper end of the suction box 20 and can be displaced conjointly with the latter in the X-direction so far that the workpiece part 2a in the second position S2 impacts the chute face 17a of the parts chute 17.

Figures 9A, 9B:
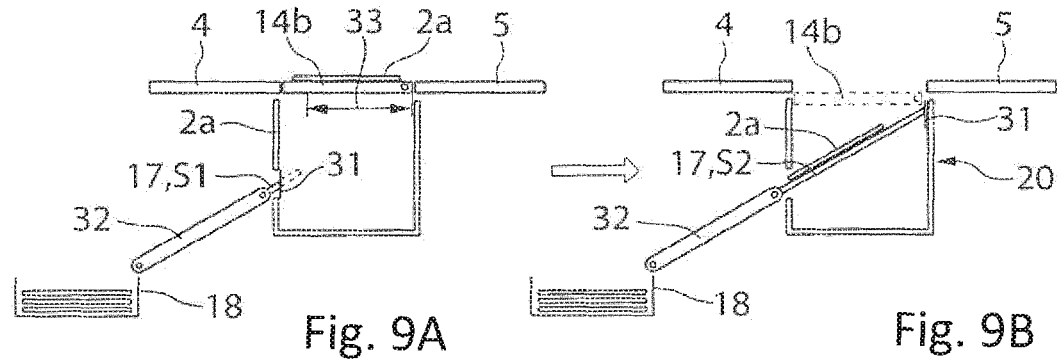
FIGS. 9A and 9B shows an illustration analogous to that of FIGS. 5A and 5B, in which the parts chute is extended in the manner of a telescope in the movement of the parts chute from the first position to the second position.

FIGS. 9A and 9B show an example of a linear movement of the parts chute 17 in which the latter in the first position is integrated in a conveyor belt 32 which adjoins the suction box 20. The parts chute 17 in the case of this example is pushed out of the conveyor belt 32 until the parts chute 17 has attained the second position S2 in which the chute face 17a is formed in the gap 6. In the case of the example shown in FIGS. 9A and 9B the parts chute 17 likewise has a vertical wall portion 31, which adjoins the chute face 17a. The vertical wall portion 31 in the case of the example shown in FIGS. 9A and 9B is significantly smaller than the vertical wall portion 31 of FIGS. 6A and 6B and covers an opening in the first side wall 20a of the suction box 20, the parts chute 17 being retracted into the suction box 20 through said opening.

It is understood that the possibility for moving the parts chute 17 between the first position S1 and the second position S2 shown in FIGS. 9A and 9B is optionally possible also without the use of a conveyor belt 32, that is to say using a stationary subarea 32 of the parts chute, as long as the collection carriage 18 is positioned at the transfer position $Y_{UP}$ only once the parts chute 17 has attained the second position S2.

It is understood that there are possibilities other than those described here in order for the parts chute 17 to be moved between the two positions S1, S2. The parts chute 17 in the first position S1 can also protrude somewhat into the gap 6, for example as is illustrated in the variant shown in dashed lines in FIG. 9A, wherein the wall portion 31 is omitted in this case. The parts chute 17 in this case protrudes into the gap 6 only so far that the parts chute 17 is located outside a movement range 33 of the processing beam 3 in the gap 6, only the extent of said gap 6 in the X-direction being illustrated in FIG. 9A. The time for the movement of the parts chute 17 between the two positions S1, S2 can be reduced in this way.

Alternatively to the collection carriage 18 described in the examples, a conveyor belt can optionally also be used as a receiving unit for the workpiece parts 2a in order for workpiece parts 2a to be moved in the Y-direction along the gap 6. However, further measures are required in this instance for sorting the workpiece parts 2a at different discharging positions, for example the provision of flaps along the conveyor belt which are capable of being pushed or pivoted in and on which the workpiece parts can be wiped from the conveyor belt into parts boxes standing beside the conveyor belt.

What is claimed is:

1. A machine for separative machining of a plate-shaped workpiece by means of a processing beam, the machine comprising:
   a first movement drive operable to move the workpiece in a first direction;
   a second movement drive operable to move a processing head in a second direction, the processing beam being directed towards the workpiece by the processing head;
   two workpiece bearing supports arranged to bear the workpiece, the two workpiece bearing supports being separated from each other by a gap that extends along the second direction such that a workpiece part that is cut free from the workpiece drops into the gap;
   a parts chute movable between a first chute position and a second chute position with respect to the gap, wherein in the second chute position a chute face of the parts chute is arranged in the gap so as to move the workpiece part that is cut free from the workpiece and dropped into the gap, laterally away from the gap; and
   a collection carriage movable in the second direction to receive the workpiece part at a transfer position, the collection carriage being configured to transport the workpiece part received at the transfer position to one or more discharging positions of the machine along the second direction, wherein the collection carriage has at least one discharging barrier movable between a first position to support the workpiece part and a second position to discharge the workpiece part.

2. The machine of claim 1, wherein the discharging barrier in the first position forms at least a subarea of a bottom side of the collection carriage, and in the second position (S2) uncovers an opening at least in the subarea of the bottom side.

3. The machine of claim 1, further comprising at least one support slide that is displaceable in the second direction in the gap and has a bearing face for supporting workpiece parts cut during separative machining, wherein the support slide or the bearing face is lowerable.

4. The machine as claimed in claim 1, further comprising a controller configured to control movement of the collection carriage between the transfer position and the one or more discharging positions of the machine in the second direction.

5. The machine of claim 4, wherein the controller is configured to arrange two support slides that are displaceable within the gap in the second direction such that
   in a first arrangement the two support slides are arranged adjacent to each other in order to support the workpiece part when the workpiece part is cut free, and
   in a second arrangement the two support slides are arranged such that a spacing between the two support slides is enlarged in the second direction in order to drop the workpiece part into the gap.

6. The machine of claim 5, wherein the controller is configured to determine the transfer position of the collection carriage based on a center of gravity position of the workpiece part along the second direction when the workpiece part is cut free.

7. The machine of claim 6, wherein each of the two support slides has a respective bearing face that bears the workpiece, and
   wherein the controller is configured to determine the transfer position of the collection carriage in the second direction in relation to a central position between mutually facing edges of the bearing faces of the two support slides when the two support slides are arranged in the first arrangement.

8. The machine of claim 7, wherein the controller is configured to determine the transfer position based on a difference between the center of gravity position of the workpiece part and the central position.

9. The machine of claim 1, wherein the two workpiece bearing supports bear the workpiece on a bearing plane, the machine further comprising: a suction box arranged in the gap below the bearing plane.

10. The machine of claim 9, wherein the parts chute in the first chute position forms a portion of a side wall of the suction box.

11. The machine of claim 1, wherein the parts chute is pivotable and/or displaceable from the first chute position to the second chute position.

12. The machine of claim 1, wherein the parts chute extends along an entire length of the gap, the length of the gap extending along the second direction.

13. The machine of claim 1, wherein the parts chute has at least one damping layer to damp an impact of workpiece parts that drop into the gap and impact the chute face.

14. A method of discharging a workpiece part from a machine in connection with separative machining of a plate-shaped workpiece by a processing beam, the method comprising:

moving a parts chute of the machine from a first chute position to a second chute position, wherein the workpiece bears on two workpiece bearing supports that are separated by a gap, such that a workpiece part cut free from the workpiece drops into the gap, and wherein the parts chute moves from the first chute position to the second chute position with respect to the gap, wherein the parts chute in the first position does not protrude into a movement range of the processing beam in the gap, and wherein in the second chute position, a chute face of the parts chute is arranged in the gap so as to move the workpiece part that is cut free from the workpiece and dropped into the gap, laterally away from the gap;

receiving the workpiece part by a collection carriage that is located at a transfer position next to the gap;

displacing the collection carriage along the gap for transporting the workpiece part to a discharging position along the gap; and discharging the workpiece part from the collection carriage at the discharging position, wherein the workpiece is movable in a first direction by a first movement drive, wherein the processing beam is directable towards the workpiece by a processing head that is movable in a second direction by a second movement drive, and wherein the gap extends along the second direction, wherein the collection carriage is movable in the second direction to receive the workpiece part at a transfer position, and wherein the collection carriage has at least one discharging barrier movable between a first position to support the workpiece part and a second position to discharge the workpiece part.

15. The method of claim 14, wherein the parts chute does not protrude into the gap in the first position.

16. The method of claim 14, further comprising:

arranging two support slides that are displaceable within the gap so as to be adjacent to each other in the gap to support the workpiece part when the workpiece part is cut free; and enlarging a spacing between the two support slides to allow the cut-free workpiece part to drop into the gap.

17. The method as claimed in claim 14, wherein the transfer position of the collection carriage is determined based on a center of gravity position of the workpiece part along the gap when the workpiece part is cut free.

18. The method of claim 17, wherein the transfer position of the collection carriage is offset from the center of gravity position.

19. The method of claim 17, further comprising arranging two support slides that are displaceable within the gap so as to be adjacent to each other in the gap to support the workpiece part when the workpiece part is cut free, wherein each of the two support slides has a respective bearing face that bears the workpiece, and wherein the transfer position is determined based on a difference between the center of gravity position of the workpiece part and a central position between mutually facing edges of the bearing faces of the two support slides that are arranged adjacent to each other when the workpiece part is cut free.

* * * * *